Jan. 28, 1969

H. E. MILLER 3,424,447

RESILIENT BUSHING WITH IMPROVED VIBRATION
ATTENUATING PROPERTIES
Filed Oct. 7, 1966

INVENTOR
Harvey E. Miller
BY Frank J. Earnheart
James A. Lucas

ATTORNEYS

United States Patent Office 3,424,447
Patented Jan. 28, 1969

3,424,447
RESILIENT BUSHING WITH IMPROVED VIBRATION ATTENUATING PROPERTIES
Harvey E. Miller, Logansport, Ind., assignor to The General Tire & Rubber Company, a corporation of Ohio
Filed Oct. 7, 1966, Ser. No. 585,169
U.S. Cl. 267—1    7 Claims
Int. Cl. F16f 1/36; B60g 11/22

ABSTRACT OF THE DISCLOSURE

This invention relates to a resilient bushing having improved properties and designed to meet the higher performance demands required in modern automotive applications. More specifically, it relates to an elastomeric insert held under radial compression between a pair of rigid sleeves, said insert comprising a pair of inter-engaged concentric elastomeric components having differing transmission characterstics, said bushing possessing good vibration isolation properties over a wide range of frequencies.

Background

In the automotive industry the recent trend has been toward increased quietness and comfort in cars. This tendency has resulted in attempts to "tune" a complete automobile to eliminate annoying harshness, vibrations, and noise at all speeds. The recent interest in radial ply tires has created additional problems in that they tend to introduce additional harshness into the ride. All of these factors have placed a big demand upon the many resilient bushings and fasteners which are used in the construction of an automobile to isolate noise and vibration between the various components, particularly between the road and unsprung mass of a vehicle and the sprung mass of said vehicle.

A bushing is typically composed of a pair of concentric, rigid members or sleeves separated from one another by an elastomer such as rubber. One of the rigid members is connected to one of the components of the vehicle and a second member to the other component with the resilient insert serving to absorb relative movement or isolate vibration between the two components.

Bushings of this type and construction, in addition to their automotive uses, have been used in many other applications wherein it is desired to minimize the transmission of noise and vibration between inter-connected, relatively movable parts.

As the analysis of sound and vibration has become more refined and the methods of isolating or eliminating these annoyances have become more complex, the structural requirements of resilient bushings have steadily become more exacting. This has placed a large demand on the bushing designer and the rubber compounder to come up with bushings having vastly improved properties. Thus, bushings exhibiting one spring rate in the radial direction and a second spring rate in the axial direction are becoming more prevalent. Furthermore, bushings of more complex design, such as duplex bushings, are being more widely used.

Description of the invention

It is one object of this invention to provide a bushing adapted to meet the stringent requirements of today's technology wherein said bushing is capable of isolating vibrations and noise over a wide range of induced frequencies.

It is another object of the invention to utilize a bushing having a resilient insert composed of two concentric parts having differing properties and fitted together to form an integral component.

Still another object is a bushing composed of inner and outer spaced apart rigid members and a resilient insert radially compressed therebetween, said insert composed of a pair of co-axial, cooperating parts having differing damping characteristics to provide improved vibration isolation over a wide range of frequencies.

Figure 1:
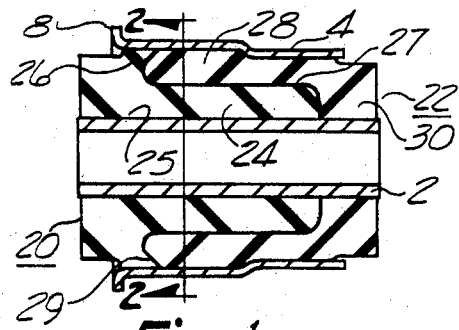
Figure 2:
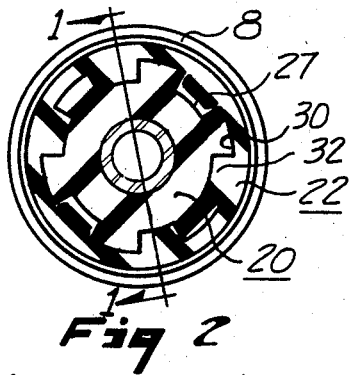
Figure 4:
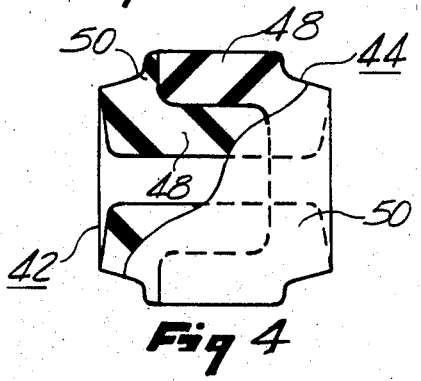
Figure 5:
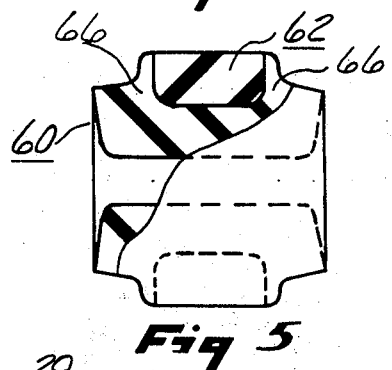
Figure 3:
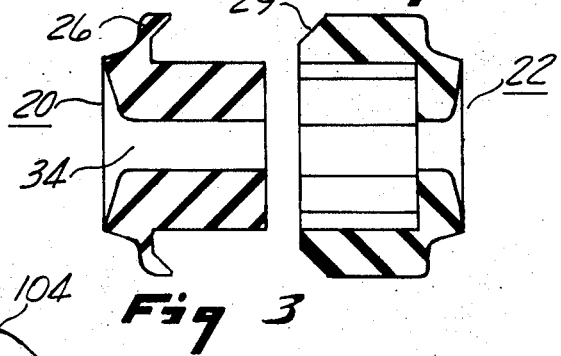
Figure 6:
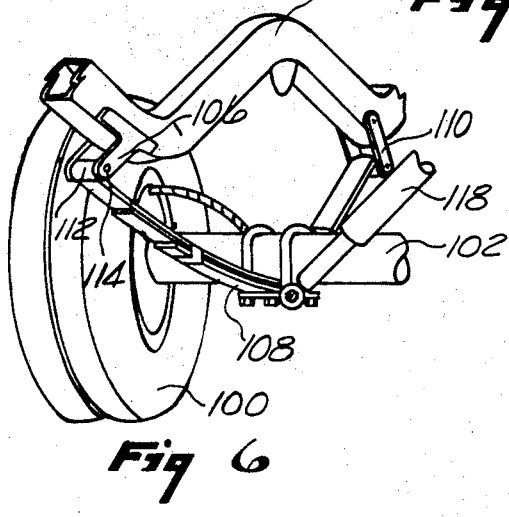

These and other objects and advantages will become apparent upon a full disclosure of this invention, with particular reference directed to the following drawings in which:

FIGURE 1 is a cross-sectional view of an assembled bushing of this invention;
FIGURE 2 is a view taken along lines 2—2 of FIGURE 1;
FIGURE 3 is a cross-sectional view of the two parts of the elastomeric insert of FIGURE 2 prior to assembly;
FIGURE 4 shows an alternative embodiment of an insert adapted for use in the bushing depicted in FIGURE 1;
FIGURE 5 represents another embodiment of an insert utilizable in the bushing shown in FIGURE 1; and
FIGURE 6 shows an assembly view of the bushing used in the eye of the rear spring of an automobile.

This invention relates to a resilient bushing comprising inner and outer rigid members with a deformable elastomeric insert radially compressed therebetween, said insert comprising a first part composed of an elastomer having given damping properties and a second part composed of an elastomer having damping characteristics which differ from those of the first part, said two parts being at least partially concentrically disposed relative to one another.

Referring now to FIGURE 1, there is shown a typical bushing of the present invention including an inner rigid member or sleeve 2 and an outer rigid member or sleeve 4 concentrically disposed in spaced-apart relationship to one another. The outer member 4 is provided with a radially outwardly extending flange 8 at one end thereof. An elastomeric insert is radially compressed between the inner and outer members and is composed of two parts 20, 22 assembled together in inter-engaging relationship.

The first part 20 of the insert is composed of a body portion 24, and a shoulder 26 extending radially outwardly therefrom. The shoulder is adapted to contact the outer sleeve in proximity to the flange 8 thereof and projects axially beyond the sleeve, terminating approximately even with the end of the inner sleeve. The body portion 24 is defined by an inner surface of revolution 25 in contact with the inner sleeve and an outer surface of revolution spaced from said inner surface and generally parallel thereto. The second part 22 of the insert is composed of a body portion 28, and a shoulder 30 extending radially inwardly therefrom to form an annulus adapted to engage inner sleeve 2. The body portion of the second part is defined by two axially extending surfaces, the inner surface engaged with the outer surface of the body of the first part along the axially extending mating surface 27, and the outer surface in contact with outer sleeve 4. The edge 29 of the body portion 28 is molded with a taper of about 45° which conforms to a similar taper molded into the shoulder 26 of the first part. In this manner the surface area and the strength of the shoulder 26 in contact with the outer sleeve 4 can be increased without decreasing the length of the mating surface 27.

It can be seen in FIGURE 2 that the mating surface 27 between the respective parts 20, 22 is composed of a plurality of inter-engaging splines 30, 32 extending in a substantially axial direction. These splines prevent relative rotation of the two elastomeric portions. The radial restraining forces imposed upon the two parts of the elastomeric insert by the inner and outer sleeves likewise prevent relative rotation and movement between the various components of the bushing.

Refering now to FIGURE 3, there is shown a view of the molded parts 20, 22 before they are fitted together and assembled between the two rigid sleeves. The portions of the insert are molded so that the annulus 34 through the bushing is normally smaller than the diameter of the inner rigid sleeve 2 and the outer diameter of the bushing is greater than the inner diameter of the outer rigid sleeve 4. Thus, when the insert is assembled around the inner sleeve 2 and within the outer sleeve 4, utilizing a suitable lubricant if necessary, the insert is radially compressed and is axially elongated, the amount of compression amounting to about 10 percent or more.

FIGURE 4 shows an alternative embodiment of an insert of the type coming within the scope of the present invention and adapted to be assembled in a bushing corresponding to that of the type shown in FIGURE 1. This insert is composed of two parts 42, 44 which telescopically engage one another in a manner similar to that of the insert shown in FIGURES 2 and 3 except for the absence of inter-engaging splines. Each part has a body portion 48 and a shoulder portion 50 extending radially therefrom. When the two parts 42, 44 are joined together and assembled in between the inner and outer rigid members, the radial compression of the elastomer causes it to undergo axial elongation in the same manner as that of the previous embodiment.

The radial compression also minimizes the possibility of slipping between the parts. It should be noted, however, that these two parts can be prevented from rotating relative to one another by other means such as by adhesively bonding two parts together.

The embodiment shown in FIGURE 5 represents still another variation wherein one part 60 of the insert is provided with a body portion and a pair of radially extending shoulders 66 which define a circumferentially extending groove therebetween. The second part of the insert is composed of an axially extending annular ring or disc 62 of substantial thickness positioned in this groove. The annular ring 62 and the shoulders are both adapted to contact the outer sleeve of the bushing. As in the previous embodiments, the two parts of the insert are fabricated from elastomeric compounds which differ from one another in their damping characteristics. For example, the part 60 with the groove therein can be composed of butyl rubber whereas the annular part 62 in the shape of a ring can be composed of natural rubber or the like.

The basic function of the elastomer used in the bushing of the present invention is to reduce the transmission of vibrations through the bushing. This results in an attenuation of the noise and harshness which would otherwise be heard and/or felt in the sprung mass of an object such as an automobile. The ability of an elastomer to absorb or reduce vibrational energy is commonly referred to as hysteresis or the damping effect of the elastomer. Thus, high hysteresis elastomers such as butadiene acrylonitrile copolymer and butyl rubber absorb a substantial amount of vibrational energy whereas Neoprene and SBR are less effective in this respect and natural rubber and terpolymers of ethylene and propylene are typically regarded as low damping rubbers.

The high hysteresis rubbers are quite effective at isolating vibrations at low frequencies. For instance, butyl rubber is outstanding in damping vibrations below 100 cycles per second. However, as the frequency of vibration increases, the isolation afforded by a high damping rubber does not increase as rapidly as that of an elastomer such as natural rubber. Thus, the lower hysteresis elastomers such as natural rubber more effectively isolate these higher frequencies.

It can thus be seen that, in the teachings of this invention, it is contemplated that the elastomeric insert be composed of two portions, the first portion composed of, for instance, butyl or butadiene acrylonitrile rubber having properties of high hysteresis and the second portion composed of natural rubber or other elastomer having properties of low hysteresis. In this manner, the bushing is capable of effectively attenuating vibrations over a wider range of frequencies than has heretofore been possible.

The compounding techniques for the various elastomeric compositions used in this invention are those which are well known to the skilled rubber compounder. These elastomers are generally blended with various reinforcing agents and fillers as well as curing agents, accelerators, antioxidants and the like. It is known that carbon black has the ability to increase the damping of the rubber without unduly increasing transmission at high frequencies. Therefore, this material is preferably used as a reinforcing agent in both parts of the elastomeric insert. However, it should be understood that other materials such as silica can be used to reinforce the elastomer.

Referring now to FIGURE 6, there is shown a typical application of a bushing of the type described in the present invention. In this instance a bushing is used in the front eye of the leaf spring of an automobile. Typically a tire and wheel 100 are rotatably attached to an axle 102, these representing the unsprung mass of an automobile.

A leaf spring 108 is connected by U-bolts to the axle and terminates in loops 112 which are adapted to receive bushings of the type covered by the present invention. A pin passes through the eye of each bushing. One end of the spring is connected to the frame 104 through a front pin which is secured between the parallel arms of bracket 106 bolted or otherwise secured to the frame 104. The rear pin comiprses a part of a shackle which pivotally connects the other end of the spring to the frame.

When the vehicle is in motion, vibrations are transmitted through the wheel and axle to the leaf spring, these vibrations covering a wide range of frequencies. Through the use of two different types of elastomers having different damping characteristics, the low frequency vibrations and high frequency vibrations are both effectively isolated. The end result is improved sound and vibration isolation over a relatively wider frequency band than was heretofore obtainable with bushings of prior design using a unitary homogeneous insert.

In carrying out the teachings of the present invention, it should be understood that the two portions of the elastomeric insert may be bonded to one another, either during vulcanization or during assembly thereof, utilizing a suitable adhesive. Alternatively they may be assembled together but left unbonded as when splines are provided to prevent relative rotation. Furthermore, one or both parts of the insert may be bonded to the inner sleeve, the outer sleeve, or both.

It is apparent that the various design factors and dimensions of the bushing as well as the components thereof can be varied within limits. For example, the number and the size of the splines can be increased or diminished as desired. Typically, the splines on the first part, as well as the grooves in the second portion, have a dove-tail cross section and are of sufficient height, representing preferably at least ten percent of the diameter of the unassembled insert, to effectively preclude relative rotation of the two elastomeric portions.

There are other types of rubber than those previously mentioned that can be utilized in carrying out the teachings of the present invention, providing they can be compounded in such a manner as to provide an insert with inter-engaging portions having different damping rates. The damping characteristics of a given elastomer can be varied by proper compounding. Thus, it is contemplated that both parts of the insert can be fabricated from the same rubber used in two differing formulations.

The embodiments of the present invention which are shown in FIGURES 1–4 show the utilization of the two elastomeric parts in a series-parallel construction while FIGURE 5 shows a modification that comprises a series construction. Both of these mechanical combinations of high and low damping elastomers make optimum utilization of the favorable characteristics of each elastomer in reducing vibrations over an unusually wide range of frequencies.

Many variations can be employed in adapting a bushing to a particular application without departing from the scope of the invention. For example, the high damping rubber may be used as the inner rubber part or the outer rubber part as desired. The various dimensions of each of the elastomeric parts, including the radial thicknesses, axial lengths, surface areas in contact with the inner and with the outer sleeves, etc., are all subject to variation. Likewise, the shape and size of the sleeves as well as their material of construction can be altered as desired.

The principles of the present invention can furthermore be utilized in the production of duplex bushings wherein three or more rigid concentric members are spaced apart from one another by two or more layers of elastomer. In this type of application it is possible that at least one of the elastomeric inserts can be formulated and fabricated in a manner as herein taught.

There are other modifications and variations that can be made in the teachings of the present invention without departing from the scope of the invention wherein I claim:

1. An annular insert adapted to be radially compressed between inner and outer concentric rigid sleeves, said insert comprising:
   (A) A first part composed of a body portion extending in an axial direction and having a first surface of revolution adapted to engage the inner sleeve and a second surface spaced radially outwardly therefrom and substantially parallel thereto, and at least one shoulder extending outwardly from said body portion radially beyond said second surface and adapted to engage said outer sleeve, and
   (B) A second part having a body portion extending in an axial direction and defined by a pair of generally parallel co-axial surfaces, the inner surface adapted to engage said second surface of the body portion of said first part and the outer surface adapted to contact the outer sleeve when radially compressed therein.

2. The insert according to claim 1 wherein the second part is provided with a shoulder extending radially inwardly into contact with the inner sleeve.

3. The insert according to claim 2 wherein the second surface of the body portion of the first part is composed of external splines and the inner surface of the body portion of said second part is composed of internal splines adapted to cooperatively engage said external splines.

4. The insert according to claim 1 wherein said first part is provided with two shoulders spaced from one another adapted to engage the outer sleeve and defining a circumferentially extending groove adapted to receive said second part.

5. The insert according to claim 1 wherein the two parts are bonded together at their interface.

6. The insert according to claim 1 wherein the insert is bonded to at least one of the sleeves.

7. The insert according to claim 1 wherein the first part is a compound of natural rubber and the second part is a compound of Butyl rubber.

References Cited

UNITED STATES PATENTS 2,044,392  6/1936  Lord _____ 267—54
3,107,953  10/1962  Palm _____ 308—36.1

DRAYTON E. HOFFMAN, *Primary Examiner.*

U.S. Cl. X.R.
267—54